United States Patent [19]

Taylor

[11] 4,329,710
[45] May 11, 1982

[54] COLOR COMPOSING VIDEO SYSTEM

[76] Inventor: Harold C. Taylor, Unit 1, Industrial Estate, Earlston, Berwickshire, Scotland

[21] Appl. No.: 179,871

[22] Filed: Aug. 20, 1980

[30] Foreign Application Priority Data

Sep. 4, 1979 [GB] United Kingdom ............... 7930627

[51] Int. Cl.³ ............................................. H04N 9/00
[52] U.S. Cl. ........................................ 358/81; 358/22
[58] Field of Search .................... 358/81, 82, 1, 21, 22

[56] References Cited

U.S. PATENT DOCUMENTS 4,229,760  10/1980  Avery ................................... 358/22

OTHER PUBLICATIONS

Shoup, "Superpaint-The Ditital Animator", Datamation, pp. 150-156, May, 1979.

Primary Examiner—Robert L. Richardson
Attorney, Agent, or Firm—Gerald J. Ferguson, Jr.; Joseph J. Baker

[57] ABSTRACT

The apparatus allows a display simulating a room or other object on a television-type display. Each segment of the room can be displayed in any desired color.

In one embodiment, a number of colors can be defined by respective color composer circuits as R,B,G signals on buses. Given colors are assigned to given areas of the display by selectors. The R,B,G signals thus defined are gated to the display by a gating unit. The control inputs to the gating unit are controlled by segment generating hardware to define the desired segments of the display on the screen.

10 Claims, 10 Drawing Figures

HORIZONTALLY DERIVED (PART TELEVISION LINES)

VERTICALLY DERIVED (WHOLE TELEVISION LINES)

COLOR COMPOSING VIDEO SYSTEM

DESCRIPTION

This invention relates to a video apparatus which allows the effect of juxtaposed colour patterns to be visualised. The invention relates particularly, but not exclusively, to an apparatus which simulates the decor of a room and permits the user to experiment with a complete range of colour combinations.

It is notoriously difficult to visualise the effect of colour applied to a given object, particuarly where a number of colours are to be juxtaposed, as in a room. Conventionally, decorators have to work from very small colour samples in the form of shade cards or swatches. These do not accurately suggest the effect of a large block of colour, and do not assist in visualising the further subjective impression of two colours in adjacent relationship.

Tri-colour television type apparatus is of course well known per se. Systems are known in which coloured images are synthesised and displayed by a tri-colour tube. However, I am not aware of any prior proposal to generate a standard picture and enable a user to vary at will the colour (hue, density and saturation) of given areas of the picture.

In accordance with the invention a video apparatus comprises:

a visual display unit for giving a colour image in response to a set of three primary colour signals;

scanning means for producing a raster scan on the visual display unit;

colour composing means for producing a plurality of sets of primary color signals, each set defining a desired colour;

segment generating means operating in synchronism with the scanning means to divide the image area into a plurality of segments to form a stylised simulation of a real object; and gating means for gating a respective set of primary colour signals to the visual display unit during scanning of each segment;

whereby a simulation of the object with different parts each in a desired colour may be achieved for visual evaluation.

In a preferred form of the invention, the segments are chosen to represent part of a room in which (at least) two walls, floor and ceiling may be shown in different colours.

The colour composing means may comprise a plurality of composers each having manually operable controls for setting the hue, saturation and black level for one desired colour. Alternatively, each colour may be set by a preset plug-in module.

An embodiment of the invention will now be described, by way of example only, with reference to the accompanying drawings, in which.

Figure 2:
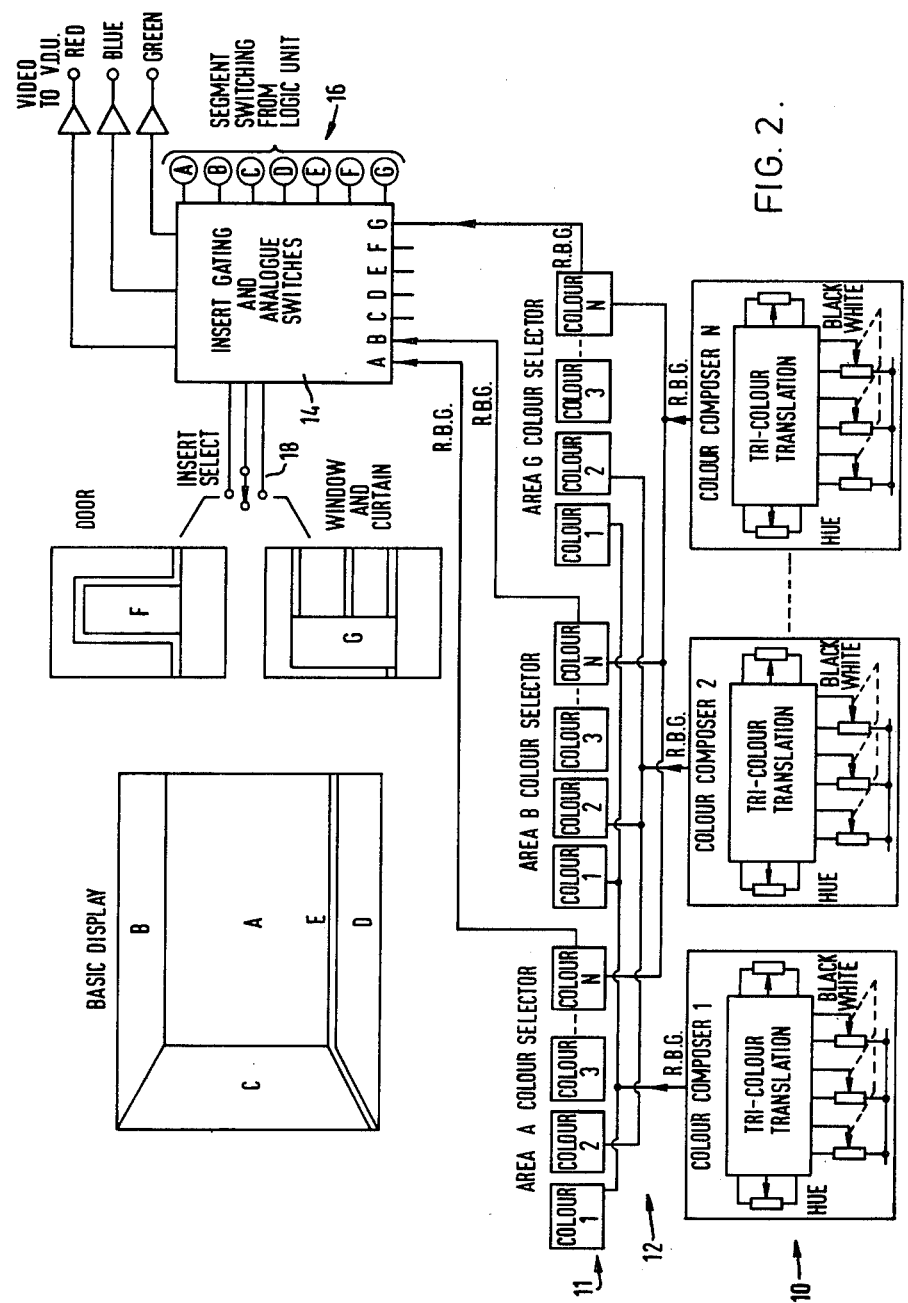
FIG. 2 is a schematic block diagram of part of the circuitry of one embodiment of the invention.
Figure 3A:
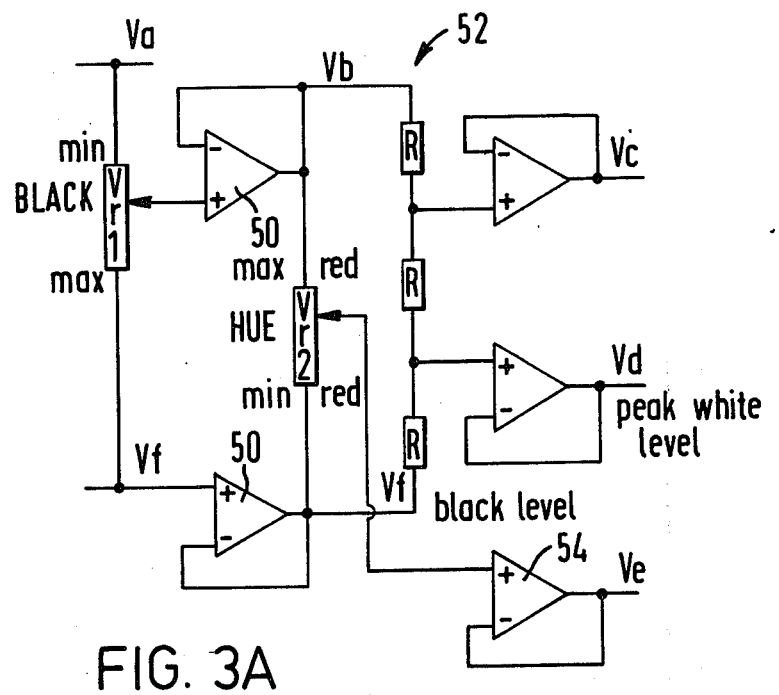
Figure 3C:
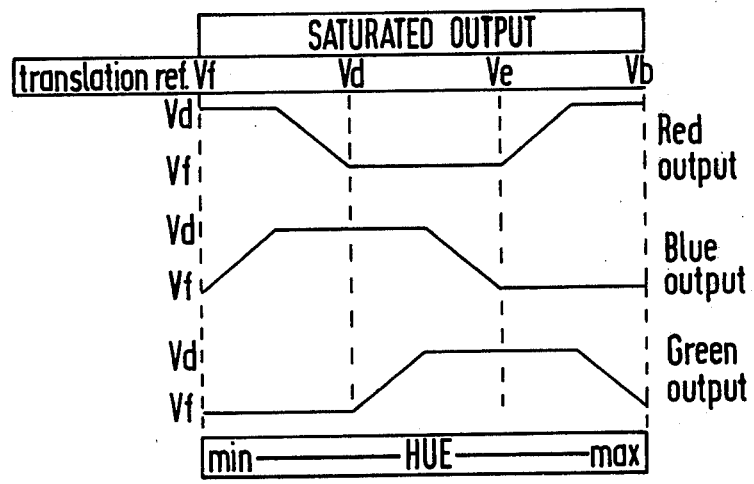
Figure 3B:
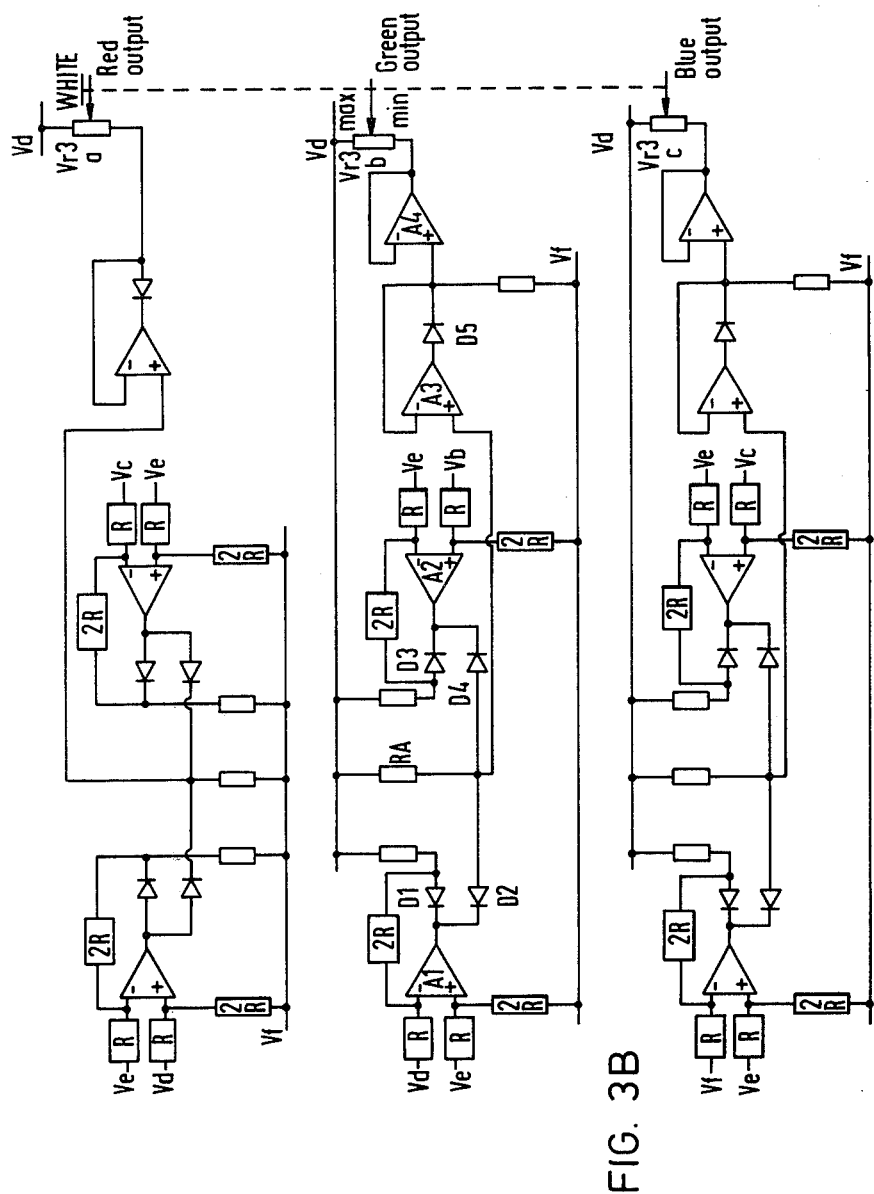
Figure 4:
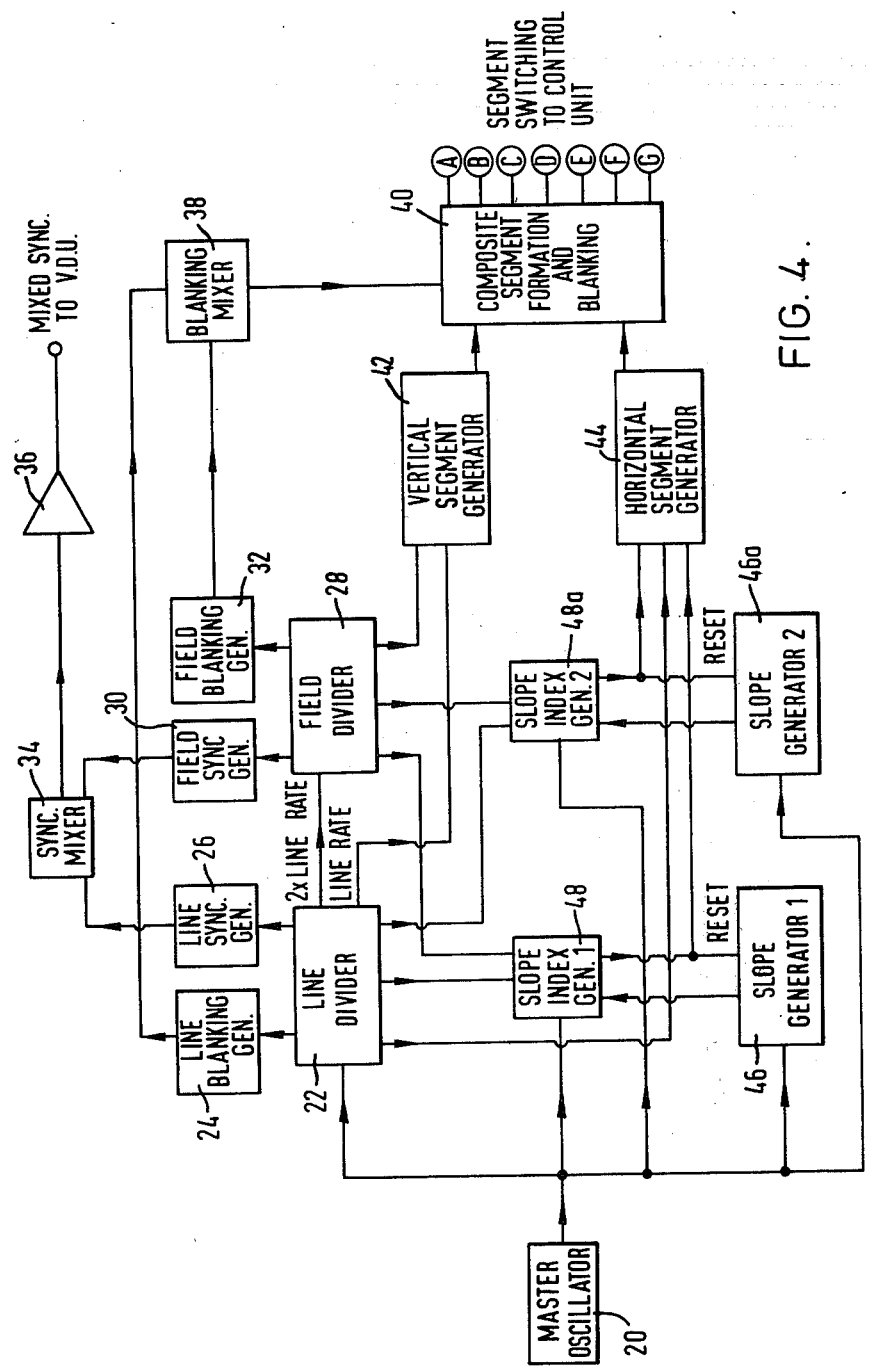
Figure 5:
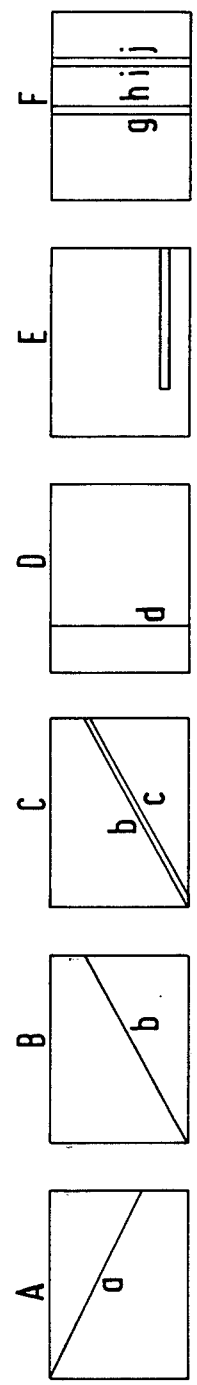
Figure 5:
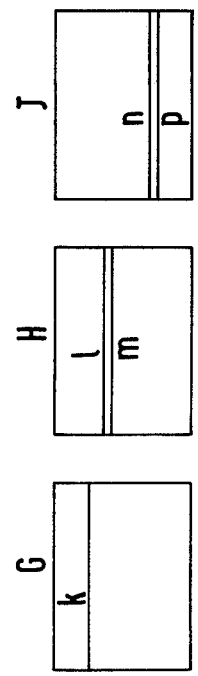

FIGS. 3A and 3B together illustrate a colour composing circuit used in the apparatus of FIG. 2;

FIG. 3C illustrates graphically the output obtainable from the circuitry of FIG. 3B;

FIG 4. is a block diagram of the remainder of the circuitry; and

FIGS. 5A-J illustrate transitions between segments of the display; and

Figure 6:
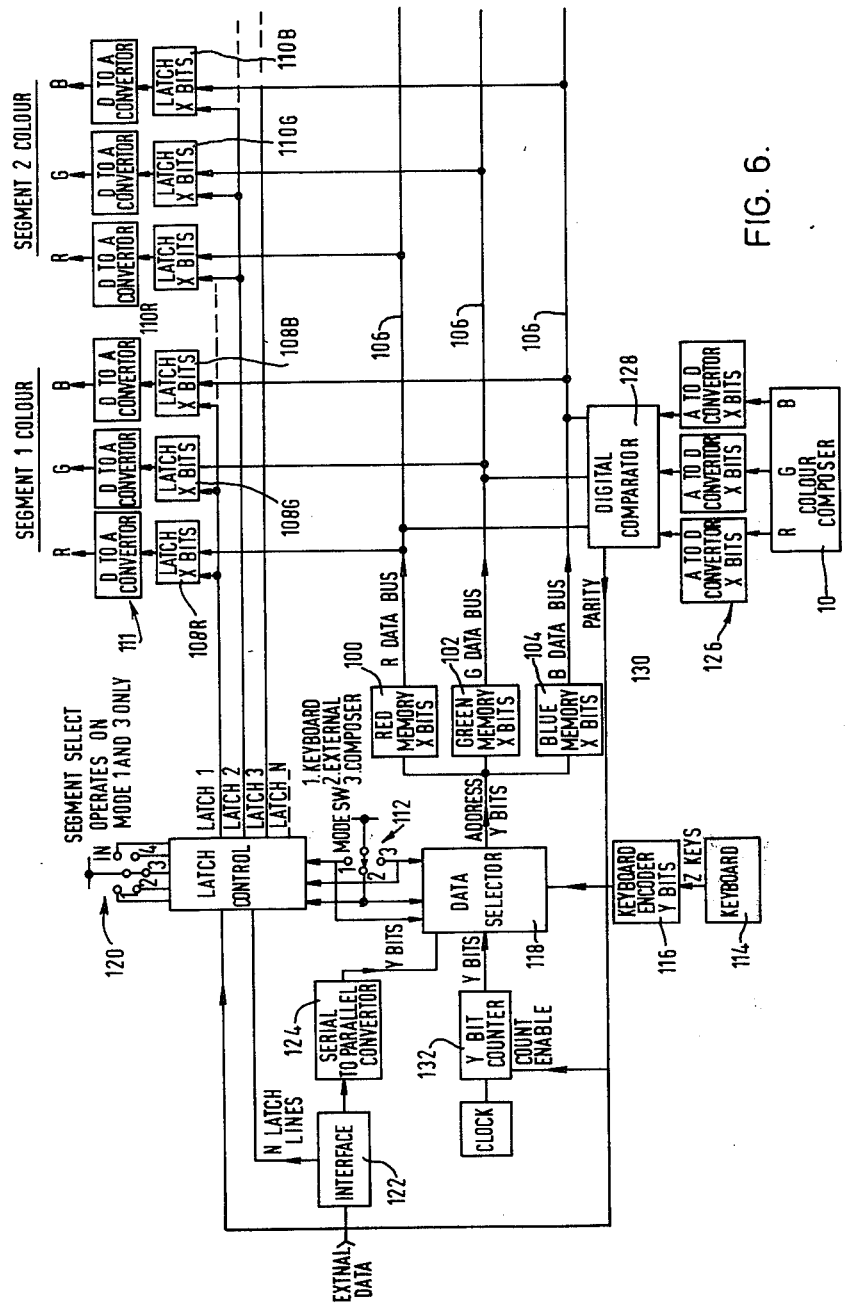

FIG. 6 is a block diagram of a modification of part of the circuitry of FIG. 2.

Figure 1A:
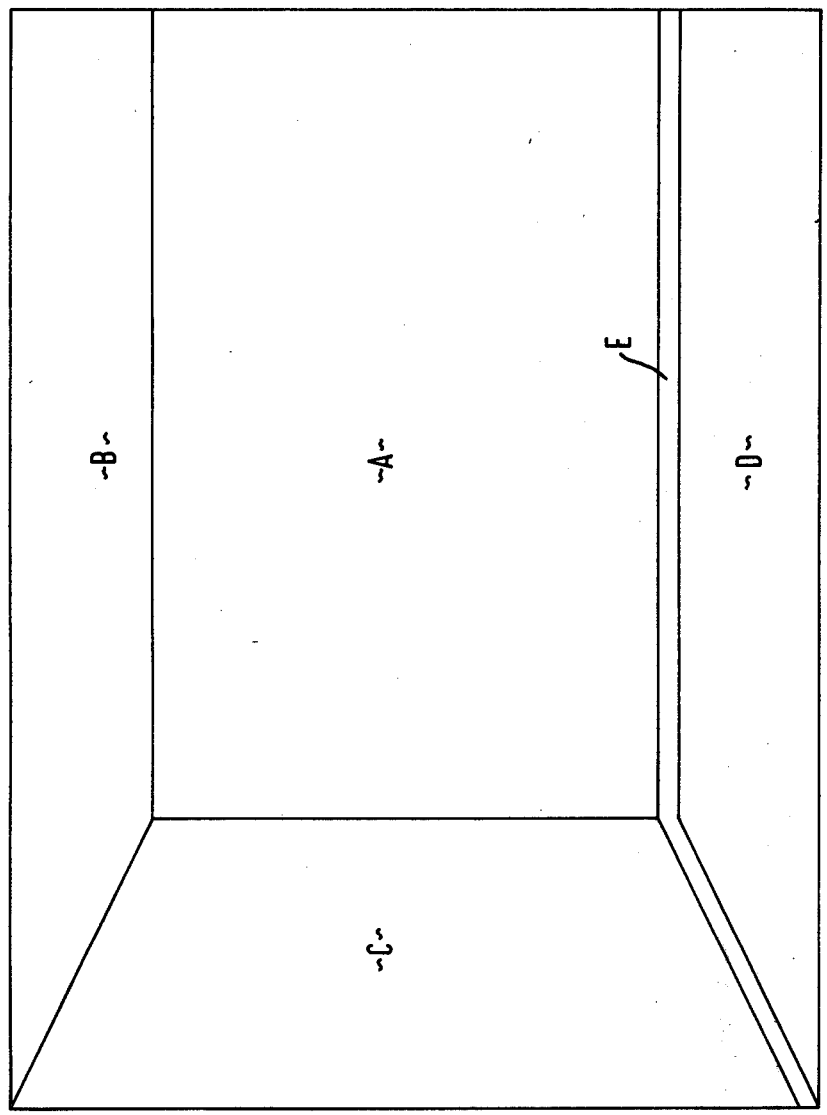
FIGS. 1A, 1B and 1C represent displays which are produced on a video screen by apparatus in accordance with the invention.
Figure 1B:
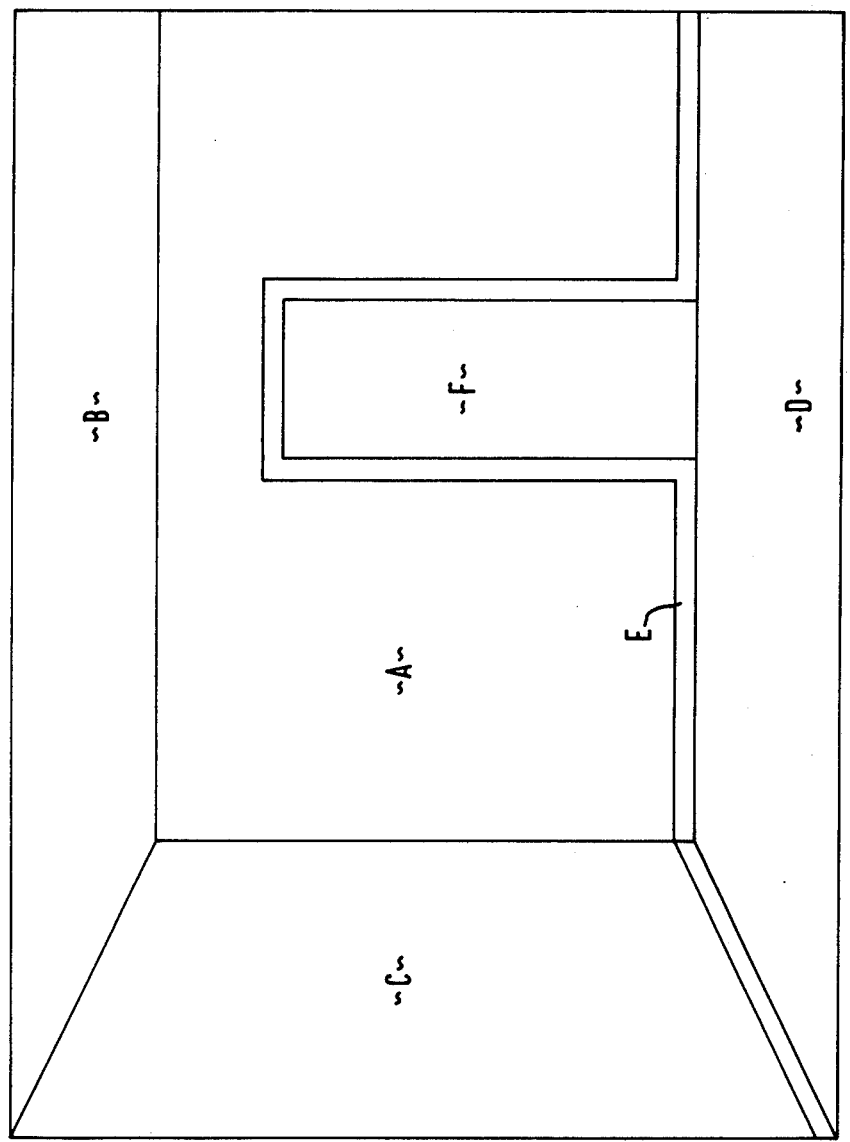
Figure 1C:
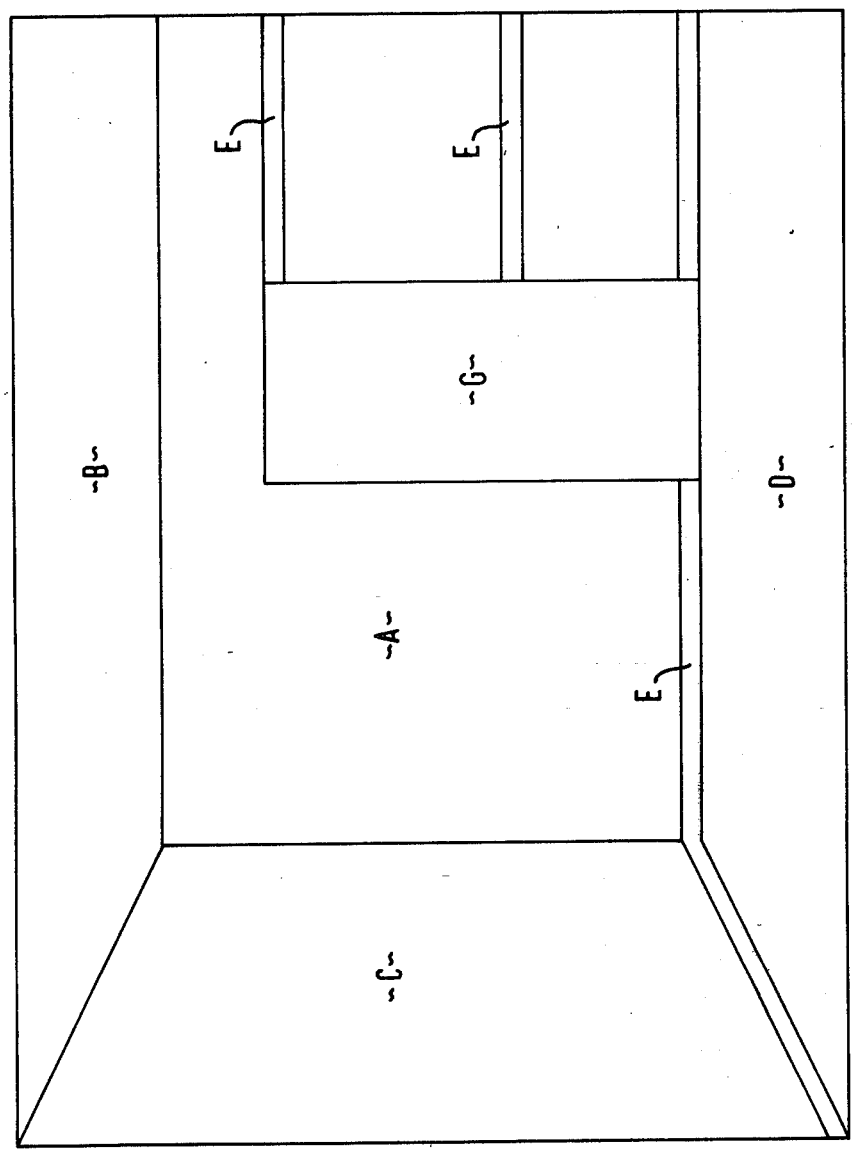

Referring to FIG. 1, the apparatus produces a display on a conventional tri-colour television-type tube. The circuitry to be described is arranged to produce a stylised perspective image of part of a room. As seen in FIG. 1A, the image comprises areas A-E respectively representing a first wall, ceiling, second wall, floor and skirting. This image may be modified to include a door F (FIG. 1B) or a window with curtain G (FIG. 1C). The apparatus enables each of the areas A-G to be displayed in any desired colour, whereby the effects of proposed decorating schemes may be appreciated and judged by the user. In the modified forms of FIGS. 1B and 1C, the door architrave and window frame are displayed in the same colour as the skirting area E, and the window itself is displayed as black.

Turning to FIG. 2, the apparatus includes a number of colour composer circuits 10. Three of these are shown, but it will be appreciated that any suitable number may be provided; eight have been found suitable. Each colour composer circuit 10 gives an analog output defining a given colour (i.e. a given combination of hue, saturation and black) in the form of red, blue and green (R,B,G) signals on lines 12. Each colour composer circuit 10 may have as shown manually operable controls for setting each of hue, saturation (white) and black. Alternatively, the colour composer circuit 10 may be in the form of a plug-in module defining a given colour, with the controls preset.

The translation module of the circuits 10 which provides R,B,G signals corresponding to the control setting is described in greater detail below.

The circuitry of FIG. 2 also includes colour selectors 11 for each area of the display, in this embodiment seven selectors 12 corresponding to the areas A-G. Each colour selector 12 comprises a switch arranged to receive the R,B,G signals for each of the colours 1-N and to give an output consisting of the R,B,G signals of a selected one colour.

The selected colour signals for the areas A-G are supplied to a gating and switching unit 14 which has the function of gating these signals to the red, blue and green inputs of a video display unit (v.d.u.) which is not shown in the drawings.

The v.d.u. is a conventional tri-colour television-type display operating with a 1:1 interlaced raster scan. A normal European standard 625 line 50 Hz display may be used. However, I have found that in this use of the display flicker is discernable at 50 Hz, and a field rate of 60 Hz or higher is preferred. Also, a high resolution is not required and 525 or fewer lines may be used. The v.d.u. screen is suitably mounted within a box for viewing through a spaced window, to prevent ambient light falling on the screen, thereby desaturating the colours and reducing contrast.

Returning to the gating and switching unit 14 of FIG. 2, this gates the selected R,B,G signals to the v.d.u. inputs under the control of switching signals at inputs 16 and mode (i.e. the picture format of FIG. 1A, 1B or 1C) selected by switch 18. The switching signals are supplied to inputs 16 by the circuitry of FIG. 4.

Turning to FIG. 3, the colour composer circuit 10 will now be discussed in detail.

The simplest arrangement for selecting a colour for display would be to provide the user with individual R,B,G controls. However, the human being does not have an innate appreciation of the relative quantities of R,B,G required to produce a given colour, and most people would find such a system unusable.

The circuitry of FIG. 3 allows colour setting to be achieved by selection with one control of a saturated colour of maximum brightness, which may be desaturated by operation of a second control to modify the colour with white without changing its hue, while a third control controls the brightness of this combination and thus effectively adds black. To the user, a sense of being able to add or delete white or black to a colour is achieved.

In FIG. 3, black level is controlled by potentiometer Vr1 (FIG. 3A), hue by potentiometer Vr2 (FIG. 3A), and saturation by triple-gang potentiometer Vr3 (FIG. 3B).

Referring to FIG. 3A, the composer circuit receives voltage levels Va and Vf from a conventional power supply (not shown). Vf is the reference black level. Vr1 is a scale setting control with reference to the black level. The output of Vr1 and Vf are buffered by voltage followers 50 to produce voltage levels Vb and Vf. Thus the scale output of Vr1 is Vb to Vf, and this is evenly divided into three by resistor chain 52 to produce reference levels Vc and Vd. The output of hue control Vr2 is buffered at 54 to produce an output Ve variable from Vb to Vf.

Variation of the hue control is translated in the circuitry of FIG. 3B to R,B,G signals in the form illustrated in FIG. 3C. The horizontal axis of FIG. 3C represents movement of the hue control Vr2. At any point in this movement, one of the R,B,G signals is at Vf, another is at Vd, and the third is between these limits. The combined signals define a given hue at full saturation, and are modified by the setting of Vr3 to add white.

Operation of the three R,B,G translations is similar and consists of translating one-sixth of the variation of Ve twice, once directly and once inverted to vary between Vd and Vf, limiting the variation to Vf and Vd, and summing the two variations to the output.

Taking the green channel as an example, amplifiers A1 and A2 are set by feedback for a gain of 2. Amplifier A1 has Vd applied to its inverting input and Ve applied to its non-inverting input referred to Vf; thus when Vd=Ve the output of amplifier A1 is Vf. If Ve is less than Vd the output of A1 is less the Vf. If Ve is increased with respect to Vd, the output of A1 increases at twice the rate; thus for one-sixth of Vb to Vf, the output of A1 reaches Vd which is one-third. If Ve is increased further diode D1 is cut off and the voltage at the junction of diodes D2 and D4 remains at Vd. D1 is included in the feedback path of A1 to compensate for the voltage drop in D2. Amplifier A2 has Ve applied to its inverting input and Vb to its non-inverting input referred to Vf. Thus when Ve=Vb, the output of A2 is Vf and a decrease in Ve of one-sixth the range Vb to Vf will produce Vd at the output of A2. Further decrease of Ve will cause diode D4 to cut off. When D4 is conducting D2 is cut off and vice versa. Thus the combined output at the junction of D2 and D4 does go more negative than Vf. The combined output is passed to a voltage follower A3 which includes a diode D5 in its feedback loop and has its output referred to Vf; this removes any variation more negative then Vf. The resulting signal is passed via a further voltage follower A4 to one gang of the saturation potentiometer Vr3 which is referenced at Vd.

The other channels operate similarly. Thus at any time, one channel has the output Vd and across its Vr3 there is no voltage drop, another channel has output Vf and across its Vr3 is the voltage Vd-Vf, and the third channel has across its Vr3 some voltage between Vd and Vf. The effect of this is that, with Vr3 at minimum, fully saturated R,B,G signals are output as defined in FIG. 3C with at least one of R,B,G at maximum level. Increasing Vr3 increases the non-maximum R,B,G signal(s) in proportion to their original difference from maximum. Thus the effect is of adding white to the saturated hue.

Having described the production of R,B,G signals defining a given colour, the application of these to selected segments of the display will now be described with reference to FIG. 4.

The circuitry of FIG. 4 is controlled by a master oscillator 20. The master frequency is divided by a line divider 22 to drive a line blanking generator 24 and a line sync generator 26 at line frequency. The line divider 22 also supplies a twice-line-frequency signal to a field divider 28 which in turn drives a field sync generator 20 and a field blanking generator 32 at field frequency. Line and field sync signals are mixed by sync mixer 34 and suplied via amplifier 36 to the v.d.u. Line and field blanking signals are mixed by blanking water 38 and supplied to an output circuit 40.

The remainder of FIG. 4 is concerned with the division of the areas A-G. The display can be defined in terms of transitions between the various segments, the transitions being illustrated in FIG. 5.

The clock frequency of the master oscillator 20 is chosen such that it will divide by a whole number N to provide the desired line frequency. In addition a given shift on the raster of one clock period for each sequential line will represent a displacement corresponding to the increment or decrement of a sloped line that is defined line sequentially.

In FIG. 5A, the line a corresponds to the transition between the side wall and ceiling of the simulated room. A signal representing the line a is derived by FIG. 3 by starting a counter 46 at the end of line blanking beginning the last line in field blanking and allowing it to divide (N+1) to the end of the field by means of slope index generator 48. The reset pulse derived in the (N+1) division is the line a in FIG. 5A. In order to achieve exact registration between odd and even fields, the clock pulse used in the (N+1) division for even fields is an inverted version of the clock pulse used in the odd fields.

In a similar manner, the sloped transition at floor level is obtained by a second counter 46a and index generator 48a operating on (N−1) and indexed to start position at the beginning of line blanking at a selected position down the field. The resulting reset signal is the line b of FIG. 5B. The width b to c (FIG. 5C) is the number of clock pulses corresponding to the displayed width of the number of raster lines required for the skirting dimension.

The remaining transition d-p lines are vertical and horizontal and are derived by counting line and field information in a vertical segment generator 42 and horizontal segment generator 44 respectively; having defined the transition lines a-p, these signals are processed by logic gates in the output circuit 40 to produce manually exclusive segments. Hence the output circuit 40 derives which segment the v.d.u. trace is in at any instant and gives corresponding enable signals A–G to the gating and switching unit 14, thus allowing the correct R,B,G signals for that instant to be switched to the v.d.u. The mixed blanking signals also permit the output circuit 40 to produce line and frame blanking by disabling the switching unit 14.

The above method of generating the segments gives segments with smooth edges and clean transitions, and avoids irregular or "corrugated" edges to the simulated parts.

It will be appreciated that modifications may be made to the embodiment described within the scope of the invention. For example, the desired colours could be generated digitally rather than in an analog fashion. It would also be possible to define the segments appearing on the screen from a memory rather than by hardware logic, thus allowing the segment pattern to be altered. Instead of using switches 12 (FIG. 2), each colour composer may be assigned directly to a given segment.

FIG. 6 illustrates a modification using digital techniques in colour generation. The circuitry in FIG. 6 may be used to replace that in the lower part of FIG. 2 for supplying the inputs A–G of the gating and switching unit 14. A single colour composer 10 is provided; this is identical with that described above. The modification of FIG. 6 constrains the apparatus to display prescribed colours only. Prescribed colours are stored as binary numbers in three memories 100, 102, 104 one each for red, green and blue. The number of bits (X) depends on the resolution required of the system and a suitable number is 8 which gives a resolution of one part in $2^8$ for each R,B,G component. Thus the total possible combinations of R,B,G is $2^{24}$ or over $16 \times 10^6$. Each of the R,B,G numbers selected are entered on a bus 106 which is connected to R,B,G latches such as 108 R,B,G and 110 R,B,G for each of the picture segments and the required analog outputs obtained by digital to analog convertors 111. The purpose of the latches 108 etc. is to hold the binary numbers while the buses 106 are supplied with a different set of numbers for another segment. Memory size is related to the number of colours to be made available; hence, if a memory of $512 \times 8$ is used the 512 colours are made available by applying the suitable 9 bit address (Y) to the memories.

There are three operating modes selected by a mode switch 112.

MODE 1—Keyboard entry

If 9 bits are used then up to 512 keys can be installed in a keyboard 114. Operating any key for a particular colour generates the appropriate 9 bit address in a keyboard encoder 116 which is passed to a data selector 118. With the switch 112 in Mode 1 this address is passed to the memories 100, 102, 104 via the data selector 118. The colour selected will be displayed in whichever segment is chosen by a segment select switch 120. Moving the segment select switch 120 to another segment will cause the previous segment latches 108 etc. to hold the binary numbers currently on the buses 106 even if the buses 106 are then re-numbered. Thus all the segments can be coloured in sequence.

Mode 2—External

This provides for colour schemes to be entered into the equipment from an external source which may be schemes recorded on an audio tape recorder. In this case the data will be entered in serial form in a segment sequence with appropriate latch control information which would be coded at the end of the colour data. An interface circuit 122 raises the incoming data stream to logic levels, separates the memory address data and latch control data, and passes the latch control data to the latch control and the colour address to a serial to parallel converter 124. In this mode the data selector 118 passes the colour address to the memories 100, 102, 104 and the buses 106 are loaded with the colour information for the appropriate segment. On receipt of the latch control information the latches of the appropriate segment are enabled and the colour stored. This process is repeated for the next segment until the whole colour scheme is complete. At this juncture an end of sequence pulse code from the recorder could be used to switch off the recorder until a decision is made to allow entry of the next colour scheme and the recorder control overriden.

Mode 3—Colour Composer

In this mode a colour composer is used as if it had the complete flexibility to compose any colour but is constrained to produce only the prescribed colours. The colour composer 10 is as described above. The R,B,G outputs from the colour composer 10 are converted to binary numbers in three analog to digital converters 126 and the numbers passed to a digital comparator 128. These numbers are compared with the numbers on the R,B,G buses 106 and if parity is achieved either exactly or within prescribed limits (e.g. $\pm 1$ bit) then a parity pulse is generated on line 130. Its use will be described later. A Y bit counter 132 (in this case 9 bits) is clocked at reasonably high rate, say 1 MHz, and all bits are applied to the data selector 118 which in this mode passes them to the memory addresses. Thus all addresses are scanned in approximately 0.5 msec. If the required parity is obtained in the scan then the parity pulse stops the counter 132 and enables the selected segment latch 108 etc. to display the colour corresponding to this address. If the colour composer controls are then moved to a different setting the parity pulse goes to zero thus causing the colour to latch at the selected segment and then after a built-in delay the counter 132 is enabled and continues to count until parity is again reached.

Although described with reference to a room, the segment pattern could be chosen to be a simulation of another artefact (e.g. a vehicle, an article of furniture, or an article of dress) to allow the relationship of areas of different colour on the artefact to be judged. Circuitry may be included to superimpose a black pattern on a given area, e.g. to simulate the texture of a carpet or folds in a curtain. For example, the curtain G of FIG. 1 can be given the appearance of draped folds by modulating the video input during this segment with additional black in the form of a slow sine wave. Suitably, each R,B,G component is modulated in proportion to its level so as to avoid changes of hue during the shading variations.

It should also be mentioned that the eye scales the brightness of a source relative to the brightness of the scene as a whole. One cannot percieve a dark colour as dark except with reference to a light one. Thus in the present apparatus, there are problems in setting a colour scheme of all dark colours. In the first embodiment above the problem is not of great practical significance since the user adjusts the controls to achieve the desired perceived effect. In the modification of FIG. 6, however, a brightness reference would be required. This may be a white frame around the picture on the v.d.u., which can easily be derived by gating white-level signals to the appropriate part of the display. Alternatively, an external light source may be positioned immediately beside the v.d.u. screen, e.g. a fluorescent tube above the screen and adjusted in brightness to be equal to peak picture white. The source should also have a colour temperature compatible the colour temperature under which a realisation of the simulated object would be viewed in practice, e.g. a daylight fluorescent tube.

I claim:

1. A video apparatus comprising:
    a visual display unit (v.d.u.) for giving a color image in response to a set of three primary color signals;
    scanning means for producing a raster scan on the v.d.u.;
    color composing means adjustable by a user to produce a plurality of sets of primary color signals, each set defining a desired color;
    segment generating means operating in synchronism with the scanning means to divide the image area into a plurality of segments to form a stylised simulation of a real object, and
    gating means for gating a respective set of primary color signals to the v.d.u. during scanning of each segment;
    whereby a simulation of the object with different parts each in a desired color may be achieved for visual evaluation.

2. The apparatus of claim 1, in which the colour composing means comprises a plurality of colour composing circuits each of which may be operated to define a desired colour, and switching means for directing the output of a selected colour composing circuit to a desired image segment.

3. The apparatus of claim 1, in which the colour composing means comprises a colour composing circuit providing analog red, blue and green (R,B,G) signals and a digital-to-analog converter for providing digital R,B,G signals; and in which the gating means includes sample-and-hold means for each display segment which may be manually operated to maintain a desired colour on that segment during further operation of the colour composing circuit.

4. The apparatus of claim 3, further including a digital store holding sets of R,B,G signals defining predetermined standard colours, and comparison means comparing the digital R,B,G signals from the colour composing circuit with the stored R,B,G signals; the comparison means enabling alteration of a displayed colour only when said signals are within a given range of coincidence.

5. The apparatus of any one of claims 2 to 4, in which the or each colour composing circuit comprises manually operable controls for setting each of hue, saturation (white), and black.

6. The apparatus of claim 5, wherein a hue potentiometer controls proportioning circuits to produce analog R,B,G signals in which, at any setting of the potentiometer, a first of the R,B,G signals is zero, a second of said signals is 100%, and the third signal is at an intermediate amplitude.

7. The apparatus of claim 6, in which incrementing of a white control acts to increase said second and third signals at a rate proportional to their difference from 100% for the chosen saturated hue.

8. The apparatus of claim 1, in which the segment generating means comprises transition generating means acting to generate transition signals defining full-screen lines, parts of which form transitions between said image segments, and blanking means which operate to blank unwanted parts of said transition signals.

9. The apparatus of claim 8, in which the transition generating means comprises means for dividing line and frame frequency signals to generate vertical and horizontal transition signals, respectively.

10. The apparatus of claim 8, in which the transition generating means includes, for generating a sloping transition signal, a clock running at a frequency of $N \times$ line frequency, and a circuit arranged to divide the clock frequency by $(N \pm x)$ where x is a small integer.

* * * * *